(12) United States Patent
Ebie et al.

(10) Patent No.: US 7,861,232 B2
(45) Date of Patent: Dec. 28, 2010

(54) SYSTEMS, METHODS AND COMPUTER PROGRAM PRODUCTS FOR RETRIEVING AND PARSING DATA AT RUNTIME

(75) Inventors: Ann Ebie, Addison, TX (US); Anthony Swan, Roanoke, TX (US)

(73) Assignee: Travelocity.com LP, Southlake, TX (US)

(*) Notice: Subject to any disclaimer, the term of this patent is extended or adjusted under 35 U.S.C. 154(b) by 1304 days.

(21) Appl. No.: 11/235,536

(22) Filed: Sep. 26, 2005

(65) Prior Publication Data

US 2007/0073706 A1    Mar. 29, 2007

(51) Int. Cl.
G06F 9/44    (2006.01)
G06F 9/45    (2006.01)

(52) U.S. Cl. .................. 717/131; 717/127; 717/139; 717/152

(58) Field of Classification Search ........................ None
See application file for complete search history.

(56) References Cited

U.S. PATENT DOCUMENTS

| | | | |
|---|---|---|---|
| 6,697,849 B1 | 2/2004 | Carlson | |
| 6,715,129 B1 | 3/2004 | Hind et al. | |
| 6,766,324 B2 | 7/2004 | Carlson et al. | |
| 6,981,212 B1 * | 12/2005 | Claussen et al. | 715/205 |
| 6,985,912 B2 * | 1/2006 | Mullins et al. | 707/103 R |
| 6,999,956 B2 * | 2/2006 | Mullins | 707/2 |
| 7,246,134 B1 * | 7/2007 | Kitain et al. | 707/102 |
| 2002/0083087 A1 | 6/2002 | Deuser et al. | |
| 2002/0143941 A1 | 10/2002 | Rich et al. | |
| 2002/0152100 A1 | 10/2002 | Chen et al. | |
| 2003/0110167 A1 | 6/2003 | Kim | |
| 2004/0168124 A1 | 8/2004 | Beisiegel et al. | |

OTHER PUBLICATIONS

Gorton et al., "An Architecture for Dynamic Data Source Integration," *Proceedings of the 38 th Hawaii International Conference on System Sciences*, 2005, pp. 1-10.

* cited by examiner

*Primary Examiner*—Chuck O Kendall
(74) *Attorney, Agent, or Firm*—Alston & Bird LLP

(57) ABSTRACT

Disclosed is a method, system and computer product for retrieving and parsing dynamic data at runtime by use of an interpreted language script that utilize Java and XML technologies. The interpreted scripting language uses a set of proxies, introspection and configuration to access and retrieve data elements that are in existence within underlying applications but not immediately available to the interpreter.

15 Claims, 6 Drawing Sheets

SYSTEMS, METHODS AND COMPUTER PROGRAM PRODUCTS FOR RETRIEVING AND PARSING DATA AT RUNTIME

FIELD OF THE INVENTION

The present invention relates in general to a computerized system, method and computer program product and the underlying interpreted computer programming language. More particularly, the embodiments of the present invention are related to a system and method for retrieving and parsing dynamic data at runtime of a code script by using an interpreted scripting language that utilizes currently prevailing standards including Java and XML technologies.

BACKGROUND

Data access in previous application programs, especially web-based application programs, is generally coded at a relatively low level, e.g., using a specific dialect of SQL to access a specific type of database. Thus, portions of the application may need to be recoded if the database is replaced with a new type of database. Specifically, it would require every new data element accessor to be compiled in the interpreter of the programming language underlying the application. This makes the application programs very inflexible and non-reusable, and overly expensive because the application providers have to recode the application program to fit different consumers' data needs.

In addition, there is another drawback related to data access in previous web-based application programs, such as CGI (Common Gateway Interface) programs. For example, if a CGI program needs to access a database, the program typically opens a database connection and then closes the connection once it is done. Since opening and closing database connections are expensive operations, these operations may significantly decrease the performance of the web server each time a CGI program runs. At a more detailed program coding level, each time when a new type of data source needs to be accessed, the interpreter has to interpret the data element accessor before the code script can be further executed to access the data elements. As a result, it would be difficult to keep the application running continuously where accessing and retrieving dynamic data is needed frequently at runtime.

The above-described problems can be best illustrated in e-commerce transactions, such as online travel booking, where the web-based application needs to access and retrieve dynamic data from different data sources or databases (e.g., user data, air data, hotel data) on a real-time basis. With the increase of web-based applications in need of frequent retrieving dynamic data, there exists a need to decouple the data retrieval process from the underlying applications so that the dynamic data elements from various existing data resources can be obtained without requiring code changes to the underlying applications. To that end, it is an object to code the data retrieval process in platform-independent programming language that provides common data documents for transporting data between two application programs and/or between an application program and a resource factory. It is also an object to structure or define data elements in platform-independent object-oriented programming language, such as Java, so that the structured data objects can be embedded within the common data document and be easily transported between applications and/or application and data repository. It is a further object to use a reflection mechanism for populating a complex object model implementation with data in the internal format of the application clients based upon the metadata in an external format contained in the transport mechanism document.

BRIEF SUMMARY OF THE INVENTION

The needs outlined above are met by the present invention which, in various embodiments, also provides a method, system and computer program product for accessing and retrieving dynamic data at runtime of an interpreted language script.

Specifically, in one embodiment, the present invention provides a method for accessing and retrieving data from different data sources at runtime of an interpreted language script. The method comprises the steps of: creating a data definition document that includes one or more tags, said one or more tags configured for accessing and retrieving data from a designated data source; including said one or more tags in said interpreted language script to represent one or more data elements whose data value is to be retrieved; and processing said interpreted language script at a processor comprising an interpreter and a data lookup engine, wherein, said interpreter is configured to interpret said interpreted language script, and further configured to delegate accessing and retrieving data to said data lookup engine upon detecting any of said one or more tags, and wherein, said data lookup engine is configured to access said data definition document and execute said one or more tags included therein, and is further configured to return retrieved data value to said interpreter.

According to another embodiment of the present invention, a system is provided for retrieving data while a code script is run interpretively. The system is comprised of a script interpreting engine configured to execute said code script; a data lookup engine in communication with said script interpreting engine, said data lookup engine configured to execute one or more tags embedded in said code script for accessing and retrieving data from different data sources; and a database accessible to said data lookup engine, said database storing at least one XML document that defines said one or more tags, each of said one or more tags embodied in a set of executable instructions that associate said tag with a Java object and a set of methods for obtaining data of said Java object at runtime.

Yet another embodiment of the present invention provides a computer program product embodied in computer-readable medium. The computer program product comprises a set of executable code instructions which are reusable in various computer applications for parsing and retrieving dynamic data while said code instructions are interpretively executed by a computer processor, said code instructions comprising: one or more tags pre-configured for accessing and retrieving data elements in different underlying applications, each of said one or more tags comprising an execution unit embodied in Extensible Markup Language (XML), said execution unit associated with a Java object that contains dynamic data value of one or more of said data elements. In a preferred embodiment, each of said one or more tags is executed at a data lookup engine while said code instructions are interpreted by a script interpreter in said computer processor.

In accordance with another embodiment of the present invention, a method for accessing and retrieving data while running an interpreted language script is provided. The method comprises the steps of: defining one or more tags in an Extensible Markup Language (XML) document, each of said one or more tags associated with a Java object that contains dynamic data value of at least a data element; including a particular tag in said interpreted language script, said tag representing a particular data element whose data is to be retrieved; detecting said particular tag while running said interpreted language script at a data interpreter engine; using a data lookup engine to access said XML document, identify a particular Java object associated with said particular tag, and determine a method for obtaining data from said particular Java object via a reflection mechanism; and returning said data from said particular Java object to said data interpreter engine.

BRIEF DESCRIPTION OF THE SEVERAL VIEWS OF THE DRAWING(S)

Reference will be made to the accompanying drawings, which are not necessarily drawn to scale, and wherein.

Figure 3A:
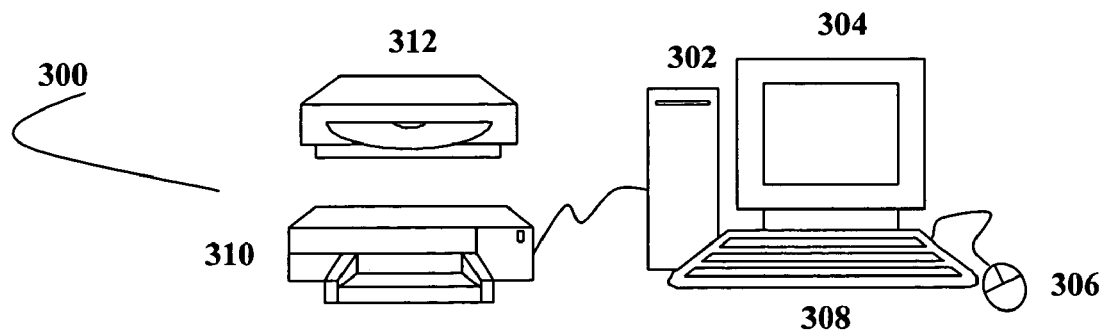
Figure 3B:
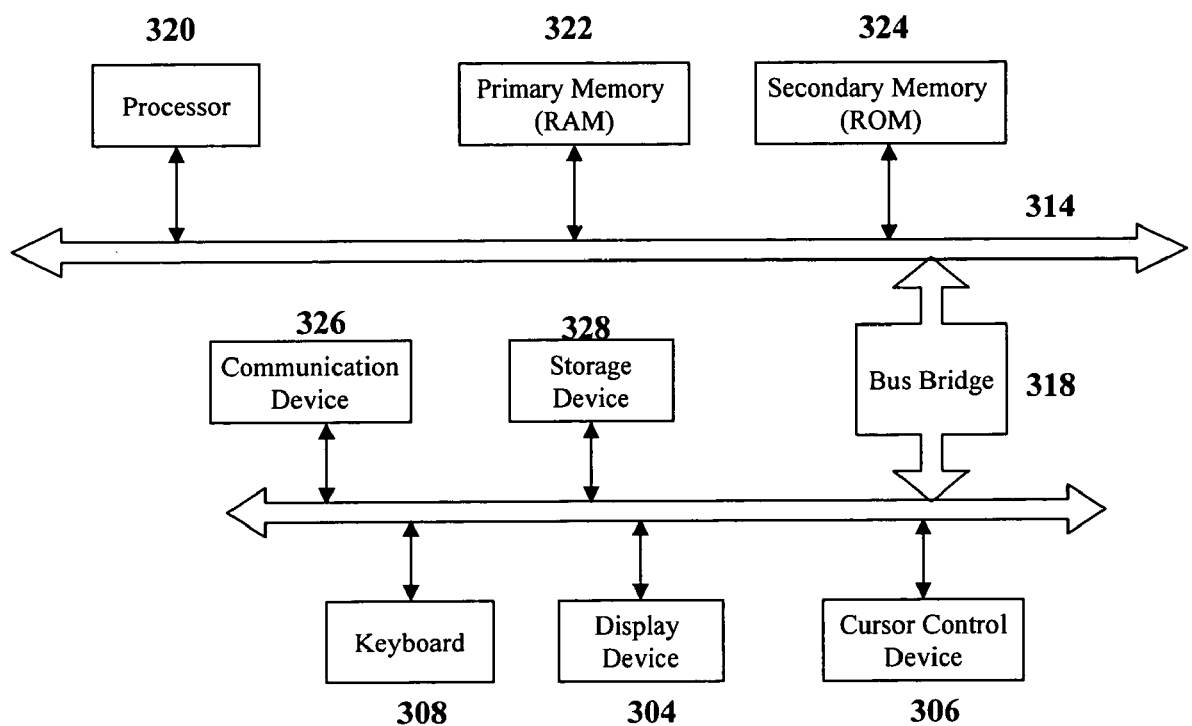
Figure 4:
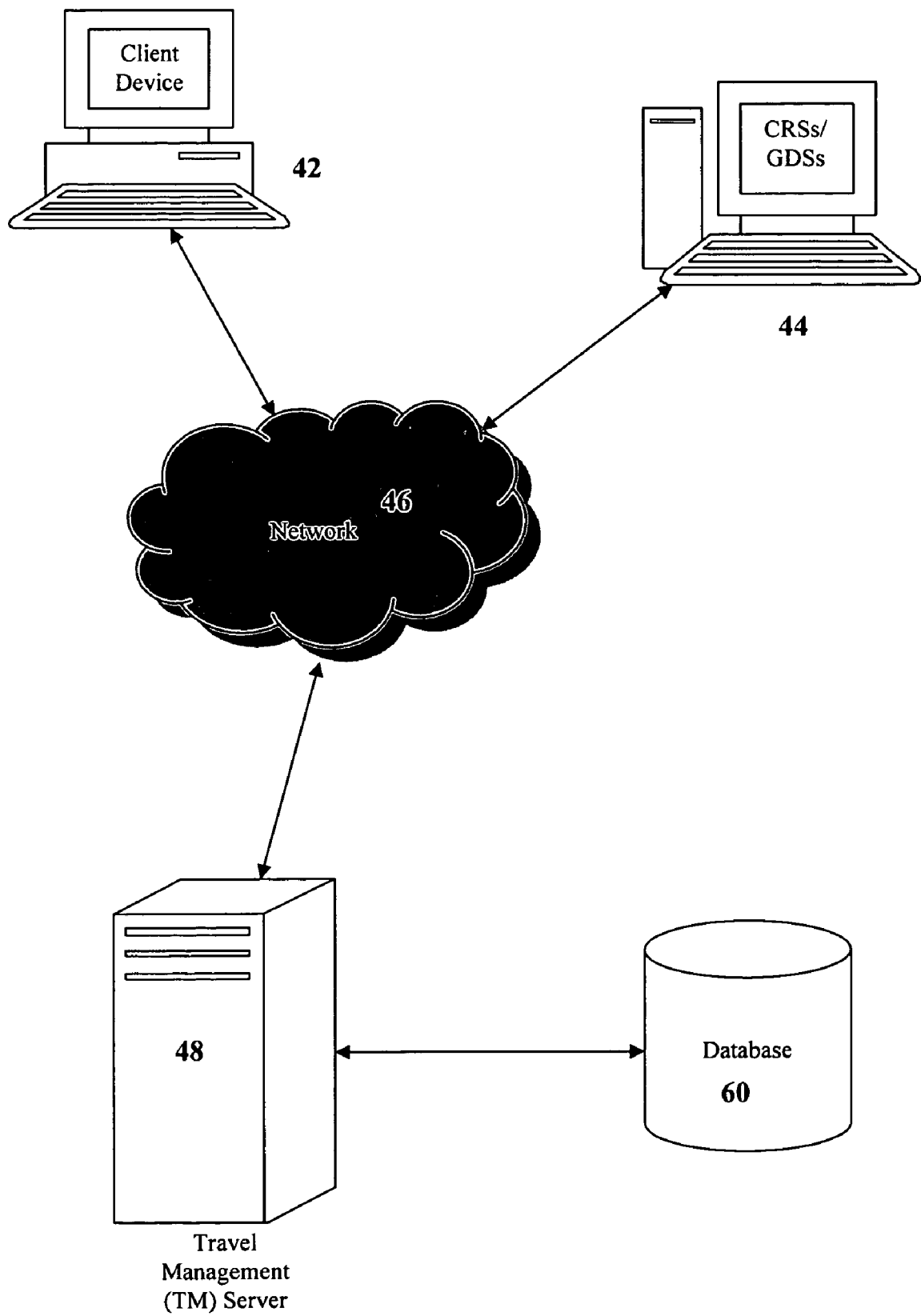
Figure 5:
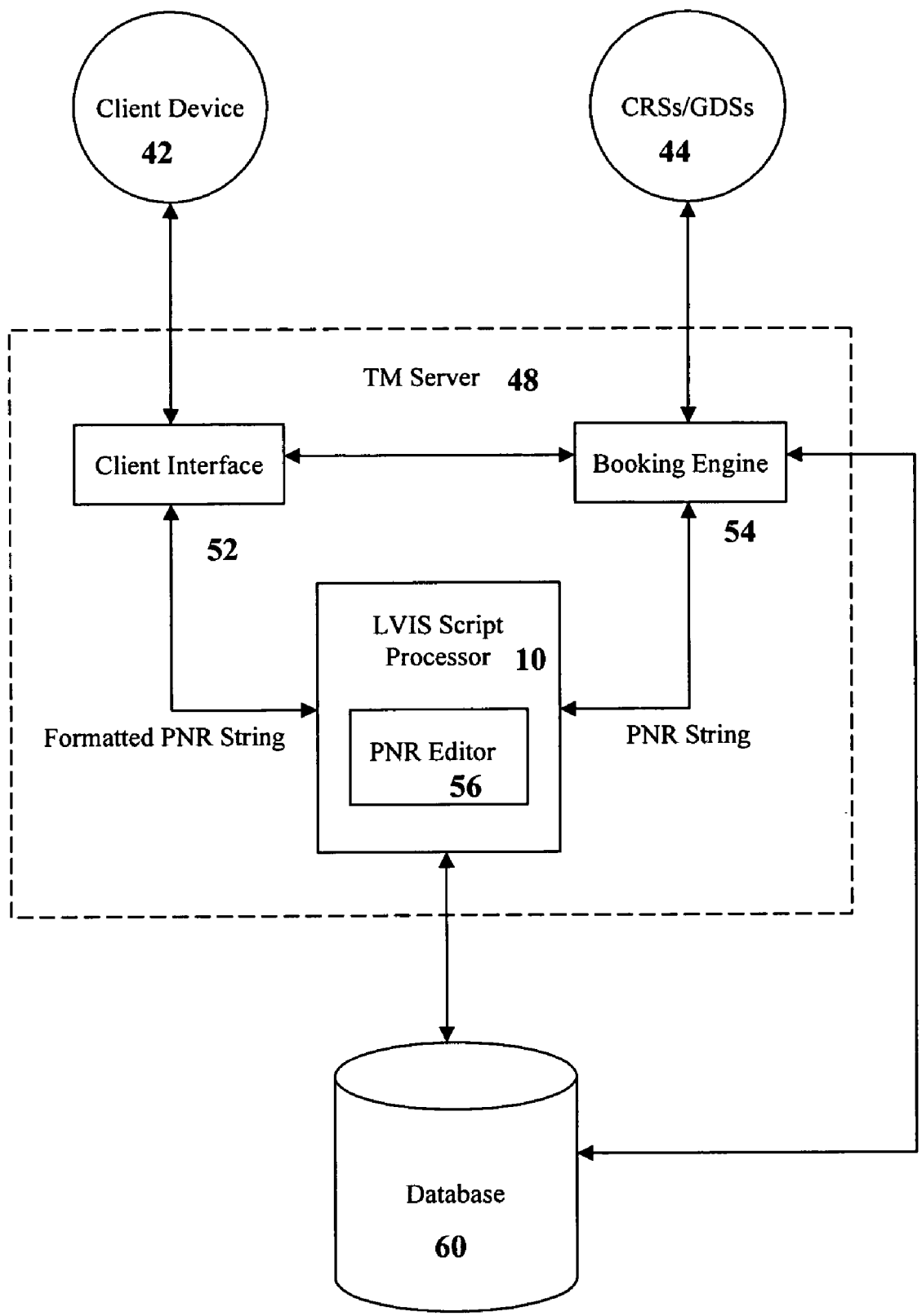
Figure 6:
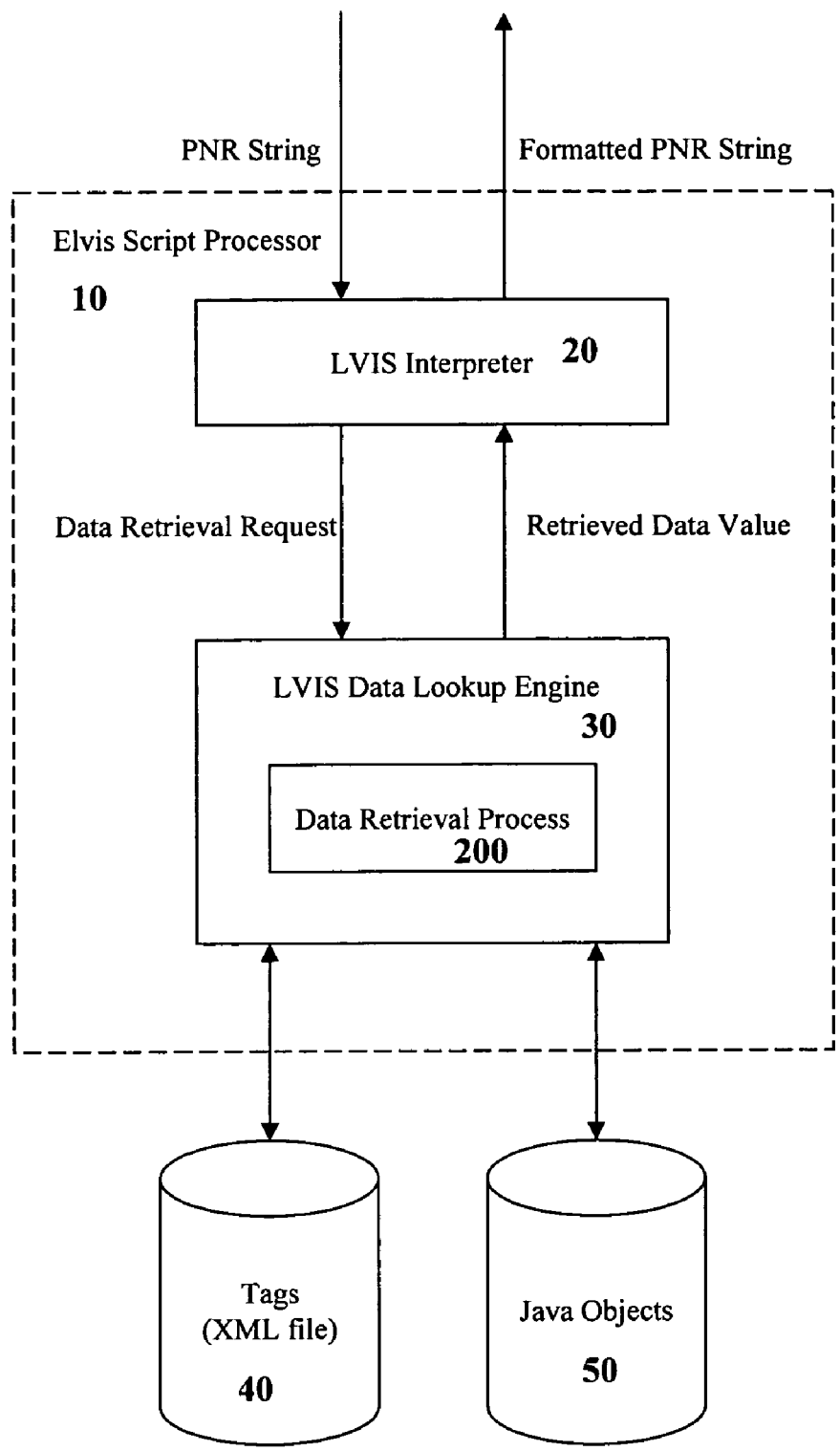

FIGS. 3a-b illustrate a conventional data processing system capable of implementing embodiments of the present invention;

FIG. 4 is a high-level view of a network framework in which a specific application, i.e., a travel management system, illustrates a practical example of the embodiments of the present invention;

FIG. 5 provides a block diagram of the travel management system of FIG. 4 where the embodiments of the present invention are practiced; and FIG. 6 provides a detailed view of the implementation of the embodiments of the present invention in the exemplary travel management system of FIG. 4.

DETAILED DESCRIPTION OF PREFERRED EMBODIMENTS

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
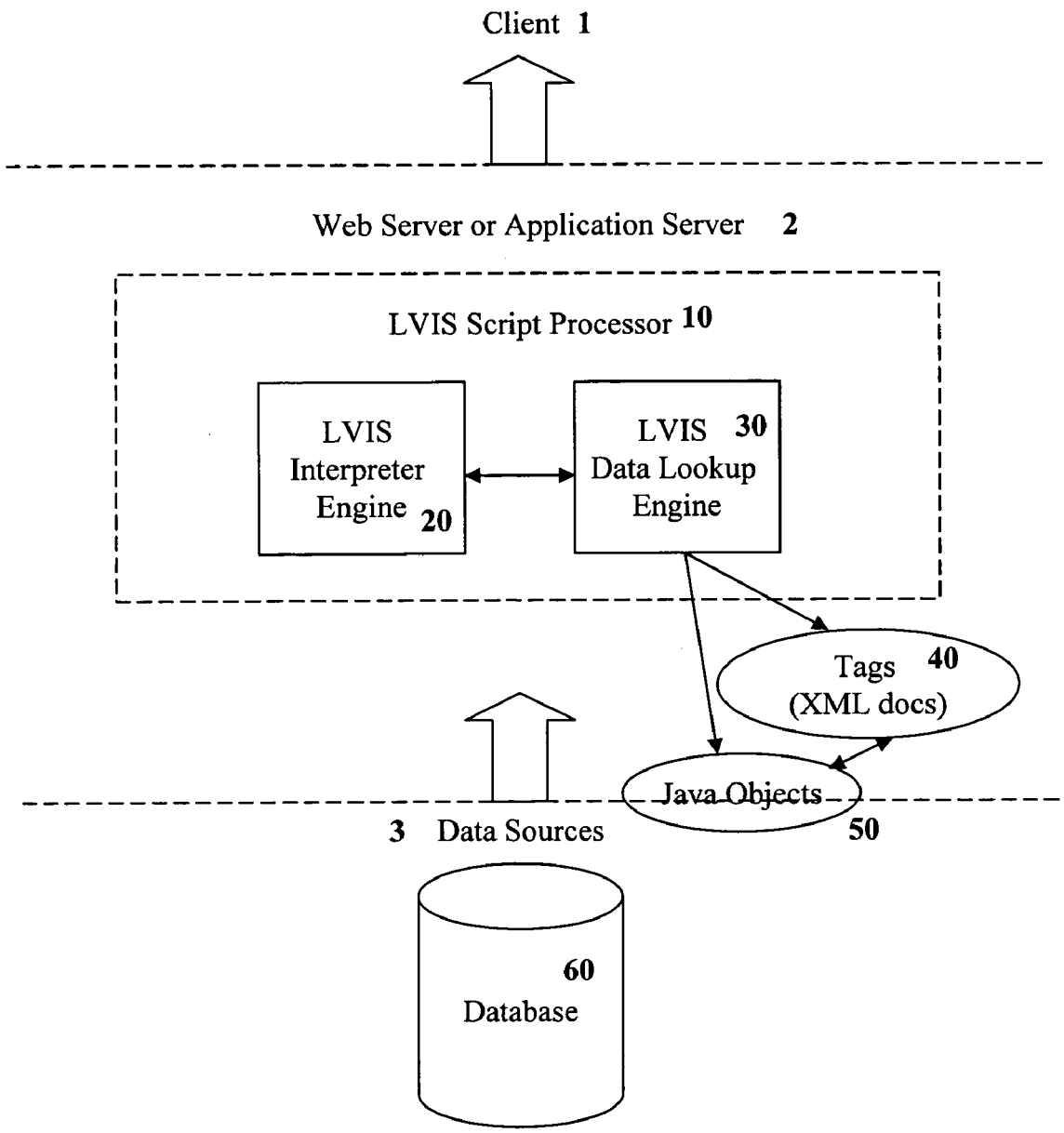
FIG. 1 illustrates, at a high-level, an abstract application context and various components of a computer scripting language that enables data access and retrieval at runtime according to one embodiment of the present invention.

Referring now to FIG. 1, a high-level view of an abstract application context illustrating various components of a computer scripting language that enables data access and retrieval at runtime according to one embodiment of the invention is shown. This interpreted script language, referred as "LVIS" in FIG. 1, uses a set of proxies, introspection and configuration to access data elements that are in existence within an underlying software application but not immediately available to the language interpreter. LVIS decouples the interpreter from the software product and provides for flexibility and reuse. In practice, an LVIS script may be used in any Java application to generate data strings that consist of both constant values and dynamic data contained in any Java object present in the Java application when the script is run. Specifically, the dynamic data is obtained by associating a tag present in the LVIS script with a Java object and a set of methods that return the desired data. As will be described in detail below, the association is configured in an XML file. At runtime the data is obtained through use of Java reflection, allowing new data to be accessed without any underlying code changes. For illustration of various embodiments of the present invention, prevailing technologies such as Java and XML are used throughout the description. However, as may be easily understood by a person of ordinary skill, use of the LVIS script in accordance with one embodiment of the present invention is not limited to Java-based applications, but includes all types of applications coded in object-oriented languages that are analogous to Java and includes, or may be further developed to include, a data-accessing functionality equivalent to Java reflection. Examples include C++, Ruby scripting language, and all other equivalents. Similarly, any reference to "XML" in this description is to be understood as including all different types of XML-equivalent markup languages.

As seen in FIG. 1, an underlying application where the LVIS script is employed typically resides on a computer server 2, e.g., a web server or application server, as the common interface between a client 1 and data sources 3. The client 1 is typically a user computer from which the user can supply or request data from an application software that resides on the web server 2. The data sources 3 represent a variety of databases 60 in which the data can be in a variety of data formats or data structures. The databases 60 are stored in some storage device. It will be readily appreciated by those having ordinary skill in the relevant arts that such storage device may include various mass storage devices such as one or more DASD arrays, tape drives, optical drives, or the like.

While the underlying application is run, an LVIS script processor 10 that contains an interpreter engine 20 and a data lookup engine 30 can easily access and retrieve data from a variety of data sources 3. Specifically, when the LVIS script being processed indicates a data retrieval node, the interpreter engine 20 performs delegation of accessing and retrieving data from data sources 3 to the data lookup engine 30. In return, the data lookup engine 30 will return and report retrieved data to the interpreter engine 20. As a person of ordinary skill may easily understand, because the process of accessing and retrieving data from a variety of data sources 3 is not compiled or encoded in the script, it can be performed while the script is run interpretively by the interpreter engine 20.

Typically, the data retrieval node in an LVIS script is embodied in one of the tags 40 that are configured for accessing the underlying data elements through a set of proxies in connection with Java objects 50. As will be illustrated in the example below, the tags 40 consist of different execution units which, preferably, are configured in eXtensible Markup Language (XML). The tags 40 are stored in a tag(s) library accessible to the data lookup engine 30. A tag is configured to be associated with at least a Java object and a set of methods that return dynamic data from the Java object. In operation, when a tag is detected from the LVIS script and executed by the data lookup engine 30, a reflection mechanism, such as Java Reflection, can be used to determine a method to obtain dynamic data from the Java object associated with the tag. As is well-known in the art, Java Reflection enables Java code to discover information about the fields, methods and constructors of loaded classes, and to use reflected fields, methods, and constructors to operate on their underlying counterparts on objects, within security restrictions. By using the reflection mechanism, only those classes in a complex object model that comprise the requested data are populated. Accordingly, an entire document need not be retrieved, converted in format, and parsed for every request for data, as was the case in the prior art. In an alternative embodiment, the LVIS script may refer to a commonly used Java object from which the data lookup engine can determine a constant or dynamic data value directly without any tag execution.

Assuming a Java object called UserProfile in the underlying application houses user profile information, the two tags below, i.e., user.first_name and user.last_name are configured to pull data from the Java object of UserProfile:

```
<fieldDescriptor>
    <baseObjectName>user</baseObjectName>
    <baseObjectClass>getthere.common.user.UserProfile
    </baseObjectClass>
    <fieldName>user.first_name</fieldName>
    <class>java.lang.String</class>
    <description>The traveler's first name</description>
    <get type="method">
        <name>getPersonalInfo</name>
    </get>
    <get type="method">
        <name>getFirstName</name>
    </get>
</fieldDescriptor>
<fieldDescriptor>
    <baseObjectName>user</baseObjectName>
    <baseObjectClass>getthere.common.user.UserProfile
    </baseObjectClass>
    <fieldName>user.last_name</fieldName>
    <class>java.lang.String</class>
    <description>The traveler's last name</description>
    <get type="method">
        <name>getPersonalInfo</name>
    </get>
    <get type="method">
        <name>getLastName</name>
    </get>
</fieldDescriptor>
```

In practice, the above-listed XML configurations allow the LVIS script processor 10, more particularly, the data lookup engine 30 interacting with the interpreter engine 20, to pull the user's first name and last name from the Java object called UserProfile by calling the methods of getPersonalInfo( ).getFirstName( ) and getPersonalInfo( ).getLastName( ) respectively on a runtime instance of the Java object using Java reflection technology.

Figure 2:
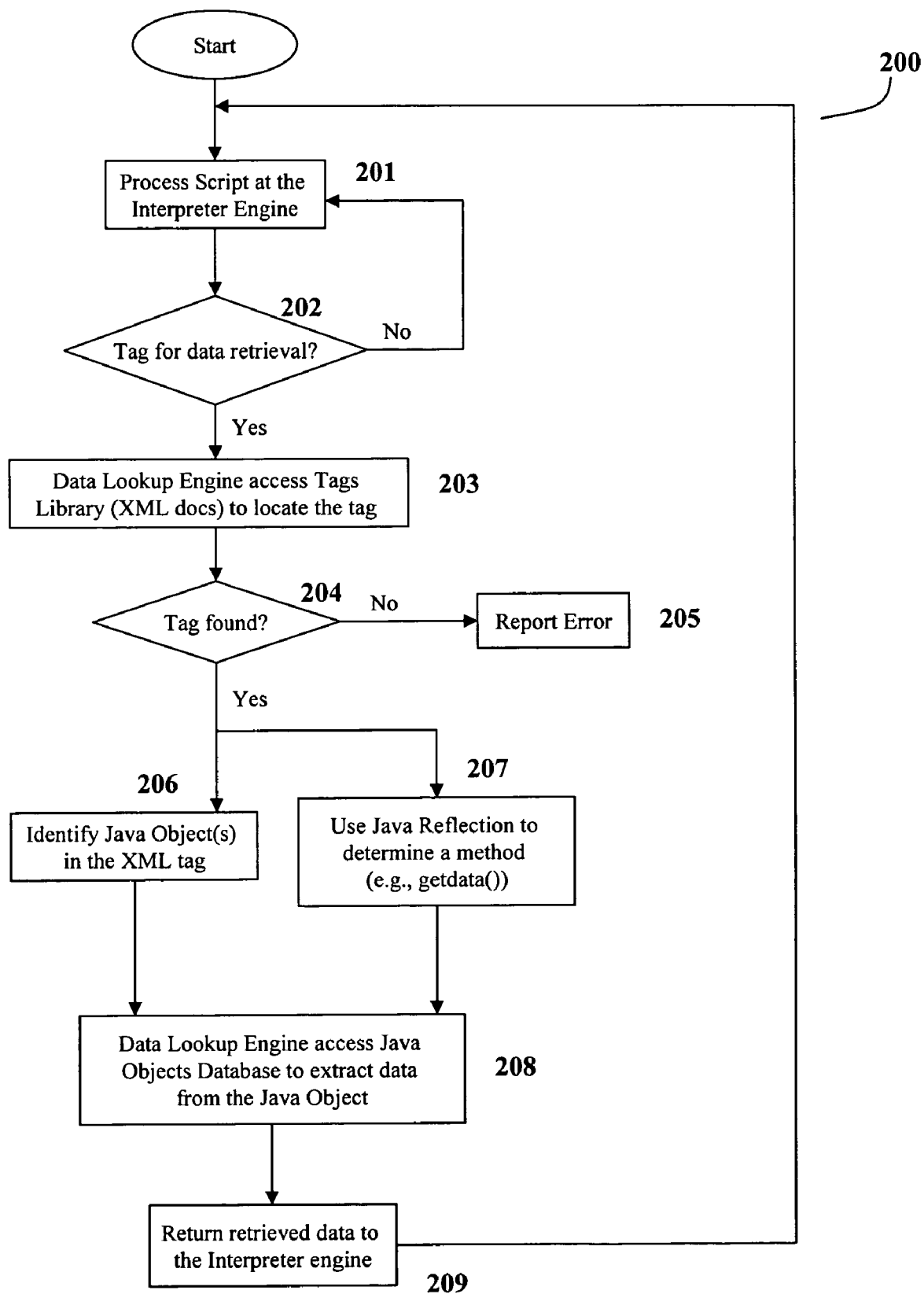
FIG. 2 is a flowchart illustrating a process for retrieving underlying data elements via XML-defined tags and Java objects according to one embodiment of the present invention.

FIG. 2 illustrates the process algorithm for retrieving underlying data elements via tags and Java objects according to one embodiment of the present invention. In addition to the above-listed exemplary tags, i.e., user.first_name and user.last_name, the data retrieval process 200 in FIG. 2 will be described using the following LVIS script as an example:

```
IF user.first_name <> "" AND user.last_name <> "" THEN
    "My Name is " + user.first_name + " " + user.last_name
ELSE
    "I have no name"
ENDIF
```

The data retrieval process 200 starts with the LVIS script being processed at the interpreter engine 20 at Step 201. While processing the LVIS script, at Step 202 the interpreter engine 20 will detect any tag included in the script which indicates a data retrieval node. If a tag is detected, the interpreter engine 20 will delegate the data retrieving process to the data lookup engine 30 that will access a tag(s) library to locate the tag as shown in Step 203. For example, in the above-described script, after the interpreter engine 20 identifies the tag of "user.first_name", the data lookup engine 30 will access a database or tag library where the XML configuration of the tag "user.first_name" is stored. At step 204, the data lookup engine 30 receives the search result whether the tag is included in the tag library. If the tag is not found, an error or bug will be reported at Step 205 to trigger a debugging module or equivalent mechanism of the LVIS script, which, though not shown in FIG. 2, is to be easily appreciated by any person of ordinary skill in the relevant art. If the tag is found, the data lookup engine 30 will execute that tag. Specifically, the execution process consists of the Step 206 at which a Java object associated with the tag is identified, and Step 207 at which Java reflection is used to determine a method for getting data from the Java object identified at Step 206. Referring to the above exemplary script, the Java object of "UserProfile" will be identified when the data lookup engine 30 accesses the XML configuration of the "user.first_name" tag. Meanwhile, the data lookup engine 30 also determines a method called getPersonalInfo( ).getFirstName( ) from the "user.first_name" tag. Similarly, the "user.last_name" tag configured in XML will be executed so as to identify the Java object of "UserProfile" and associated method called getPersonalInfo( ).getLastName( ). At Step 208, the data lookup engine 30 will use the determined method to get dynamic data from the identified Java object. Specific to the above-mentioned example, the data lookup engine 30 will be able to pull the user's first name and last name from the Java object of "UserProfile" by calling the methods of getPersonalInfo( ).getFirstName( ) from the "user.first_name" tag and getPersonalInfo( ).getLastName( ) from the "user.last_name" tag respectively. Under the existing technologies, such as JavaBeans developed by Sun Microsystems Corp., in order to obtain data for the field named ".LastName", a call method of getLastName( ) (through semantics alone) has to be used as direct mapping. According to one embodiment of the present invention, however, by replacing logic into the interpreted code portion, the LVIS script can accomplish much deeper call methods. Using the above example, under the LVIS system calling the field name ".LastName" can be equated to a call method of getTraveler(0).getPersonalInfo( ).getLastName( ). Further, as can be easily appreciated by any person of ordinary skill, data can be obtained on a runtime instance of the Java object without the need to interpret any script coded for retrieving data, as is commonly used in the art. As shown at Step 209, the data lookup engine 30 returns the retrieved data to the interpreter engine 20 that will then run the script using the retrieved data value. In the above example, the runtime result for a user named John Doe would be:

"My Name is John Doe"

For a user who has not set up his name in the UserProfile, the same script would produce:

"I have no name"

FIGS. 3a-b illustrates a conventional data processing system useable for implementing embodiments of the present invention. More particularly, FIG. 3a illustrates an example of a data processing system 300 configured in a computer device in which the features of the present invention may be utilized. As illustrated in FIG. 3a, data processing or computer system 300 is comprised of a system unit 302, output devices such as display device 304 and printer 310, and input devices such as keyboard 308, and mouse 306. Data processing system 300 receives data for processing by the manipulation of input devices 308 and 306 or directly from fixed or removable media storage devices such as CD disk 312 and network connection interfaces (not illustrated). Data processing system 300 then processes data and presents resulting output data via output devices such as display device 304, printer 310, fixed or removable media storage devices like disk 312 or network connection interfaces. It should be appreciated that the computer device used for implementing the present invention can be any sort of computer system (e.g. personal computer (laptop/desktop), network computer, server computer, or any other type of computer).

Referring now to FIG. 3*b*, there is depicted a high-level block diagram of the components of a data processing system 300 such as that illustrated by FIG. 3*a*. In a conventional computer system, system unit 302 includes a processing device such as processor 320 in communication with main memory 322 which may include various types of cache, random access memory (RAM), or other high-speed dynamic storage devices via a local or system bus 314 or other communication means for communicating data between such devices. Primary memory 322 is capable of storing data as well as instructions to be executed by processor 320 and may be used to store temporary variables or other intermediate information during execution of instructions by processor 320. The computer system 300 also comprises a read only memory (ROM) and/or other static storage devices 324 coupled to local bus 314 for storing static information and instructions for processor 320. System unit 302 of the data processing system 300 also features an expansion bus 316 providing communication between various devices and devices attached to the system bus 314 via the bus bridge 318. A data storage device 328, such as a magnetic disk 312 or optical disk such as a CD-ROM and its corresponding drive may be coupled to data processing system 300 for storing data and instructions via expansion bus 316. Computer system 300 can also be coupled via expansion bus 316 to a display device 304, such as a cathode ray tube (CRT) or a liquid crystal display (LCD), for displaying data to a computer user such as generated meeting package descriptions and associated images. Typically, an alphanumeric input device 308, including alphanumeric and other keys, is coupled to bus 316 for communicating information and/or command selections to processor 320. Another type of user input device is cursor control device 306, such as a conventional mouse, trackball, or cursor direction keys for communicating direction information and command selection to processor 320 and for controlling cursor movement on display 304.

A communication device 326 is also coupled to bus 316 for accessing remote computers or servers via the Internet, for example. The communication device 326 may include a modem, a network interface card, or other well-known interface devices, such as those used for interfacing with Ethernet, Token-ring, or other types of networks. In any event, in this manner, the computer system 300 may be coupled to a number of servers via a network infrastructure as will be described in detail below with reference to FIG. 4.

Referring now to FIGS. 4-6, a specific Java-based application, i.e., Passenger Name Record (PNR) Editor that is employed in a travel management system (the "TM system" hereinafter), will be described to illustrate how embodiments of the present invention can be practiced for scripting the underlying application so that data can be retrieved while the script is run interpretively. As will be easily appreciated by any person of ordinary skill in the relevant art, the PNR Editor application to be described below only exemplifies one scenario to use the embodiments of the present invention. As a matter of fact, embodiments of the present invention can be applied in almost all Java applications to achieve a faster and reusable approach for data retrieval.

Basically, the TM system allows clients to utilize multiple computer reservation systems (CRSs) for making travel related bookings over the Internet. More specifically, in the TM system the client can book a travel item segment (e.g., flight, hotel, rental car) from any one of the CRSs accessible to a central server of the TM system. When the client books a travel item, the booked travel item segment is stored in a passenger name record (PNR). Once the online booking process is completed and confirmed by the client, the information stored in the PNR record will be displayed as the client's itinerary. Typically, the client would be a travel agency that tends to have the PNR records formatted in its preferred format before providing the itinerary information to its customers. For example, the travel agency may need to add certain remarks, or change certain fields showing the booking origins, or change the passenger name to match what it keeps in the user profile. This gives rise to a need to make the PNR record data configurable so as to match the requirements of different clients. This need can be satisfied by the PNR Editor application that is able to format each line of the PNR record. However, currently the PNR Editor application is coded in a scripting language that requires each new data element accessor to be complied into the language interpreter for parsing and retrieving the new data elements. Such requirement would make the language interpreter dependent upon the different types of data sources. In other words, whenever data elements from a new data source need to be accessed, the underlying code script for data retrieval including definitions of variables has to be changed and thus is hardly reusable. In addition, most of the data elements are only available at the booking time. If the data accessor has to be interpreted every time when the new data element needs to be retrieved, the booking process could be slowed down, thereby rendering the online TM system to be very time-consuming and inefficient. As will be described in detail the following paragraphs, such problem can be resolved by using the embodiments of the present invention (i.e., LVIS interpreted language) to script the PNR Editor application. The LVIS script language decouples the interpreter from the underlying application and data elements and provides for flexibility and reuse.

FIG. 4 provides a block diagram illustrating a network framework of the above-mentioned TM system using the PNR Editor application that can be practiced with the embodiments of present invention. In FIG. 4, the illustrated framework includes a server, i.e., a PNR TM system server 48 (to be discussed in detail later) coupled to and in communication with a database 60 in a storage device via a database server (not illustrated), as well as with various clients devices 42 and a plurality of computer reservation system CRSs 44, including global distribution systems (GDSs) and direct connected CRSs, via a network 46. It should be appreciated by those having ordinary skill in the network-related arts that client devices 42 and server 48 may be coupled to the network 46 in a variety of ways including through direct or dial-up telephone or other network transmission lines, using a modem pool (not illustrated), or through an additional network and gateway (not illustrated). For example, the client devices 42 can communicate with the server 48 via a link utilizing one or more of the plain old telephone system (POTS), a cellular phone system, cable, Digital Subscriber Line, Integrated Services Digital Network, satellite connection, computer network (e.g. a wide area network (WAN), the Internet, or a local area network (LAN), etc.), or generally any sort of private or public telecommunication system, and combinations thereof. Examples of a transport medium for the links include, but are not limited or restricted to electrical wire, optical fiber, cable including twisted pair, or wireless channels (e.g. radio frequency (RF), terrestrial, satellite, or any other wireless signaling methodology).

The network 46 is typically a computer network (e.g. a wide area network (WAN), the Internet, or a local area network (LAN), etc.), which is a packetized or a packet switched network that can utilize Internet Protocol (IP), Asynchronous Transfer Mode (ATM), Frame Relay (FR), Point-to-Point Protocol (PPP), Voice over Internet Protocol (VoIP), or any other sort of data protocol. The network 46 allows the communication of data traffic between the client device 42 and the server 46 using packets. Data traffic through the network 46 may be of any type including text, graphics, video, e-mail, Fax, multi-media, documents, voice, audio, and other generic forms of data. The network 46 is typically a data network that may contain switching or routing equipment designed to transfer digital data traffic. It should be appreciated that the FIG. 4 environment is only exemplary and that embodiments of the present invention can be used with any type of telecommunication system and/or computer network, protocols, and combinations thereof.

In one embodiment of the present invention, the TM system server 48 includes a web server and an application server to provide travel management system functionality to users of the client device 42. For example, using the Hypertext Transfer Protocol (HTTP) and Hypertext Markup Language (HTML) or Extensible Markup Language (XML) code across network 46, the TM system server 48 can communicate with client devices 42 to facilitate this functionality.

Utilizing conventional web browser client applications such as Netscape™ Navigator™ published by Netscape™ Corporation of Mountain View, Calif., the Internet Explorer™ published by Microsoft™ Corporation of Redmond, Wash., the user interface of America Online™, or the web browser or HTML/XML translator of any other well-known supplier, client devices 42 may supply data to, and access processed or unprocessed data from the PNR TM system server 48 and may also run server-provided, web-based application software. It will be appreciated by those having ordinary skill in the network-related arts that network 46 may be organized as either a wide-area (WAN) or local-area (LAN) network, and may be administered as a private network (an intranet), a public network (the Internet), or a combination of private and public networks (an extranet).

According to one embodiment of the present invention, the information communicated between client devices 42 and the PNR TM system server 48 includes customer travel profiles, corporate travel policies, travel booking information related to airlines, car rentals, hotels, information related to CRSs, and other information associated with requesting and booking travel related items for client. This information can be stored in the database 60 within storage devices. It will be readily appreciated by those having ordinary skill in the relevant arts that storage device may include various mass storage devices such as one or more DASD arrays, tape drives, optical drives, or the like, and that the aforementioned information may be stored in any one of a variety of formats or data structures.

Referring now to FIG. 5, a block diagram of the TM system server 48 is shown. In FIG. 5, the TM system server 48 includes a client interface 52, a booking engine 54, and an application called PNR Editor 56 that is executed by the LVIS script processor 10 according to one embodiment of the present invention. The TM system server 48 is coupled to a plurality of computer reservation system CRSs 44, including global distribution systems (GDSs) and direct connected CRSs. The PNR TM system server 48 provides access to the plurality of computer reservation systems (CRSs) 44 for a client to initiate a travel booking request. The client can book a travel item segment from any one of the accessible CRSs 44. A travel item segment can be an air segment, a car segment, a hotel segment, or other types of useful segments related to travel. CRSs for particular travel item segments are predefined for the client, along with particular conditions, prior to a travel booking request, utilizing the PNR Editor 56, and are stored in the database 60.

The booking engine 54 reads the database 60 to determine the predefined CRSs for the client and accesses the predefined CRSs from the network of CRSs 44 to check the availability of travel items. The available travel items are displayed via the client interface 52 to the client device 42 for booking. When the client selects a travel item segment for booking, the booking engine 54 books the travel item with the respective CRS, and the booked travel item segment is stored in a passenger name record (PNR) in the database 60. The PNR TMS server 48 is coupled to the database 60 for storing and retrieving booking records and predefined CRSs (e.g. client profiles or configurations), etc. In some embodiments, the PNR record includes a CRS designation (e.g. the name of the CRS or the CRS locator) associated with each travel item segment. The PNR booking record can then be accessed by the client device 42, via the client interface 52, for modification. Also, in some embodiments, the PNR TM system server 48 can be coupled to travel agencies and clients (e.g. corporate clients) that fulfill tickets booked through the TM system server 48.

The functionality of the client interface 52 of the TM system server 48 can include utilizing a web server. For example, the web server can function as an interface between the TM system server 48 and the various client devices 42 by presenting a client interface, for example, via HTML-specific Java Server Pages (JSPs). For example, using the Hypertext Transfer Protocol (HTTP) and Hypertext Markup Language (HTML) or Extensible Markup Language (XML) code across network, the client interface 52 of the TM system server 48 can facilitate communications with the client devices 42. Utilizing conventional web browser client applications such as Netscape™ Navigator™ published by Netscape™ Corporation of Mountain View, Calif., the Internet Explorer™ published by Microsoft™ Corporation of Redmond, Wash., the user interface of America Online™, or the web browser or HTML/XML translator of any other well-known supplier, client devices may supply data to, and access processed or unprocessed data from the TM system server 48, and may also run server-provided Web-based application software, in order to perform functionality provided by the TM system server 48. The client interface 52 also performs the function of displaying the PNR booking record (representing the client's booked itinerary) to allow the client to create, change, or cancel booked travel item segments, even though they are through different CRSs, via the client interface 52. Thus, a client of the TM system can transparently make travel bookings using more than one CRS (GDSs and direct connect CRSs) for different travel item segments (e.g. air, car, and hotel) to thereby choose the best travel item for themselves.

Typically, the TM system server 48 is a high-end server computer but can be any type of computer system that includes circuitry capable of processing data (e.g. a personal computer, workstation, minicomputer, mainframe, network computer, laptop, desktop, etc.). For example, embodiments of the invention can be generally implemented in the TM system server 48 that includes a processor that processes information in order to implement the functions of the TM system server 48. As illustrative examples, the "processor" may include a central processing unit having any type of architecture, a digital signal processor, a microcontroller, or a state machine. Typically, the processor is coupled to a memory. The memory can be non-volatile or volatile memory, or any other type of memory, or any combination thereof. Examples of non-volatile memory include flash memory, Read-only-Memory (ROM), a hard disk, a floppy drive, an optical digital storage device, a magneto-electrical storage device, Digital Video Disk (DVD), Compact Disk (CD), and the like whereas volatile memory includes random access memory (RAM), dynamic random access memory (DRAM) or static random access memory (SRAM), and the like.

The PNR Editor 56 configured for formatting the PNR records includes script coded in the LVIS interpreted language. By virtue of the LVIS language, a reusable script is provided for retrieving dynamic data in the data formatting process according to one embodiment of the present invention. FIG. 6 illustrates in detail a block diagram of the above-described components of the LVIS scripting language as implemented to support the data-formatting functionality of the PNR Editor 56. As seen in FIG. 6, while running the application called PNR Editor 56, the LVIS script processor 10 receives data input as PNR editor strings. The LVIS interpreter 20 keeps executing the PNR editor strings until it performs the delegation to the LVIS data lookup engine 30, which is triggered by a data retrieval request or identification of a data retrieval node that is embodied as a tag as described above. Then the data retrieval process 200 will be performed according to the flowchart algorithm in FIG. 2. As shown in the above-described data retrieval process, the LVIS data lookup engine 30 has access to a tag(s) library and various Java objects stored in a database. By using Java reflection, the LVIS data lookup engine 30 is able to determine a method for obtaining data that is associated with the tag in the script. The following examples illustrate the use of LVIS script in accessing data involving PNR Editor Strings:

EXAMPLE 1

```
If itinerary.has_air THEN
    "5r<lowfare " + util.today.FORMAT("MMMDD") + "/" +
    tpeval.ta_lower_fare +"USD"
ENDIF
```

This example allows a travel management company to keep track of the lowest fare offered on the booking date by adding a remark to the PNR string that indicates the lowest fare offered to the user. In operation, such lowest fare is stored in a memory while the user is shopping online. Assuming the itinerary being booked has air, the outcome of running the above script will be that the following lowest-fare remark will be added to the PNR: "5r<lowfare SEP21/102.00."

EXAMPLE 2

```
IF itinerary.has_air THEN
    "5r<reason code-" +
    IF itin.ta_rsn_code_air = "LP" AND
```

-continued

```
        tpeval.ta_lower_fare_cents = itinerary.tot_airfare THEN
            "LF"
        ELSE
            tpeval.ta_rsn_code_air
        ENDIF
ENDIF
```

In this example, one can add a remark with a specific reason code for being out of the company travel policy. Additionally, a user may select a reason code from a dropdown list of codes, each being defined to indicate a justification for being out of the company's travel policy. Under certain conditions, a reason code can be modified with added remarks. As shown above, if the itinerary contains air, then a remark with the reason for being out of policy will be added. If the user further selects the reason code "LP" and the itinerary's fare is the lowest fare, then the reason code will be modified.

While the present invention and its various functional components been described in particular embodiments, it should be appreciated the present invention can be implemented in hardware, software, firmware, middleware or a combination thereof and utilized in systems, subsystems, components, or subcomponents thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readabl-e medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method for accessing and retrieving data from different data sources at runtime of an interpreted language script, said method comprising:
    executing a software application including an interpreted language script, the interpreted language script including a tag representing a data element whose data value is to be retrieved during execution of the software application; and during execution of the software application, executing the interpreted language script using a script interpreting engine; and
    detecting the tag in the interpreted language script, and upon detecting the tag:

(1) delegating accessing and retrieving data from a data source to a data lookup engine;
(2) accessing a definition of the detected tag from a library including the definitions of a plurality of tags using the data lookup engine, the definitions of the tags specifying manners of accessing and retrieving data from different data sources;
(3) retrieving, from a designated one of the different data sources, the data value of the data element represented by the detected tag, the data value being retrieved according to the definition of the detected tag in the library; and
(4) returning the retrieved data value to the script interpreting engine from the designated data source.

2. The method of claim 1, wherein said library including the definitions of a plurality of tags comprises an XML document.

3. The method of claim 1, wherein the detected tag is associated with a Java object.

4. The method of claim 3, wherein the manner of accessing and retrieving data specified by the definition of the detected tag comprises a set of methods to extract dynamic data from said Java object.

5. A system for retrieving data while a code script is run interpretively, said system comprising:
a script interpreting engine configured to execute the code script during execution of a software application including the code script;
a data lookup engine in communication with said script interpreting engine, said data lookup engine configured to execute a tag embedded in the code script, the tag representing a data element whose data value is to be retrieved during execution of the software application; and
a database accessible to said data lookup engine, said database storing a library including definitions of a plurality of tags, the definition of each tag being embodied in a set of executable instructions and a set of methods for obtaining data at runtime.

6. The system of claim 5, wherein said data lookup engine is further configured to report retrieved data to said script interpreting engine for executing said code script continuously.

7. The system of claim 5, wherein the library in said database comprises an XML document.

8. The system of claim 5, wherein the set of executable instructions in the library of said database associate a tag with a Java object and the set of methods for obtaining data of the Java object at runtime.

9. The system of claim 5, wherein the library stored in said database is configurable so as to provide a reusable data accessor for different data sources.

10. The system of claim 8, wherein the set of executable instructions use a reflection mechanism to determine a method from the set of methods to return retrieved data.

11. A method for accessing and retrieving data while running an interpreted language script, said method comprising:
defining one or more tags in an Extensible Markup Language (XML) document, each of said one or more tags being associated with a Java object that contains dynamic data value of at least a data element;
including a particular tag of the one or more tags in an interpreted language script, said tag representing a particular data element whose data is to be retrieved;
detecting said particular tag while running said interpreted language script at a data interpreter engine;
using a data lookup engine to access said XML document, identify a particular Java object associated with said particular tag, and determine a method for obtaining data from said particular Java object via a reflection mechanism; and
returning said data from said particular Java object to said data interpreter engine.

12. A computer program product for accessing and retrieving data from different data sources at runtime of an interpreted language script, said computer program product comprising at least one computer-readable storage medium having computer-readable program code portions stored therein that in response to execution by a processor cause an apparatus to at least perform the following:
executing a software application including an interpreted language script, the interpreted language script including a tag representing a data element whose data value is to be retrieved during execution of the software application; and during execution of the software application,
executing the interpreted language script using a script interpreting engine; and
detecting the tag in the interpreted language script, and upon detecting the tag:
(1) delegating accessing and retrieving data from a data source to a data lookup engine;
(2) accessing a definition of the detected tag from a library including the definitions of a plurality of tags using the data lookup engine, the definitions of the tags specifying manners of accessing and retrieving data from different data sources;
(3) retrieving, from a designated one of the different data sources, the data value of the data element represented by the detected tag, the data value being retrieved according to the definition of the detected tag in the library; and
(4) returning the retrieved data value to the script interpreting engine from the designated data source.

13. The computer program product of claim 12, wherein said library including the definitions of a plurality of tags comprises an XML document.

14. The computer program product of claim 12, wherein the detected tag is associated with a Java object.

15. The computer program product of claim 14, wherein the manner of accessing and retrieving data specified by the definition of the detected tag comprises a set of methods to extract dynamic data from said Java object.

* * * * *